United States Patent
Asakawa

(10) Patent No.: US 12,203,378 B2
(45) Date of Patent: Jan. 21, 2025

(54) TURBOCHARGER WITH VARIABLE GEOMETRIC FLUID GUIDE MECHANISM

(71) Applicant: IHI Corporation, Tokyo (JP)

(72) Inventor: Takao Asakawa, Tokyo (JP)

( * ) Notice: Subject to any disclaimer, the term of this patent is extended or adjusted under 35 U.S.C. 154(b) by 0 days.

(21) Appl. No.: 18/321,783

(22) Filed: May 23, 2023

(65) Prior Publication Data

US 2023/0287798 A1      Sep. 14, 2023

Related U.S. Application Data

(63) Continuation of application No. PCT/JP2021/039683, filed on Oct. 27, 2021.

(30) Foreign Application Priority Data

Nov. 25, 2020   (JP) ................................. 2020-195046

(51) Int. Cl.
| | |
|---|---|
| *F01D 17/16* | (2006.01) |
| *F01D 25/24* | (2006.01) |
| *F02B 37/24* | (2006.01) |

(52) U.S. Cl.
CPC ............ *F01D 17/16* (2013.01); *F01D 25/24* (2013.01); *F02B 37/24* (2013.01); *F05D 2220/40* (2013.01)

(58) Field of Classification Search
CPC . F01D 17/167; F05D 2260/38; F05D 2260/52
See application file for complete search history.

(56) References Cited

U.S. PATENT DOCUMENTS

| | | | |
|---|---|---|---|
| 7,322,791 B2 * | 1/2008 | Stilgenbauer | ......... F01D 17/165 415/164 |
| 8,662,833 B2 * | 3/2014 | Wengert | .................... F02C 6/12 415/206 |

(Continued)

FOREIGN PATENT DOCUMENTS

| | | |
|---|---|---|
| DE | 102009007663 | 8/2010 |
| JP | 2004-132367 | 4/2004 |

(Continued)

OTHER PUBLICATIONS

International Preliminary Report on Patentability with Written Opinion dated Jun. 8, 2023 for PCT/JP2021/039683.

(Continued)

*Primary Examiner* — Courtney D Heinle
*Assistant Examiner* — Danielle M. Christensen
(74) *Attorney, Agent, or Firm* — SOEI PATENT & LAW FIRM

(57) ABSTRACT

A turbocharger includes a turbine housing accommodating a turbine wheel, a bearing housing rotatably supporting a rotating shaft to which the turbine wheel is fixed, a variable geometry mechanism accommodated in the turbine housing, surrounding the turbine wheel, and configured to guide a fluid to the turbine wheel, and a spring member held by the variable geometry mechanism and the bearing housing in an axial direction along the rotating shaft. The variable geometry mechanism has an inner circumferential portion surrounding a through hole in which the turbine wheel or the rotating shaft is disposed, and an outer circumferential portion located between the spring member and the turbine housing. The outer circumferential portion is distanced further away from a rotational axis of the rotating shaft than the inner circumferential portion. The outer circumferential portion includes a first end face contacting the spring (Continued)

member, and a second end face contacting the turbine housing.

19 Claims, 5 Drawing Sheets

(56) References Cited

U.S. PATENT DOCUMENTS

| | | | | |
|---|---|---|---|---|
| 9,163,557 | B2* | 10/2015 | Blümmel | ............. F02B 37/225 |
| 2004/0081567 | A1 | 4/2004 | Boening | |
| 2007/0071595 | A1* | 3/2007 | Mukherjee | ............ F01D 17/165 |
| | | | | 415/165 |
| 2011/0038742 | A1 | 2/2011 | Fleig et al. | |
| 2021/0054783 | A1 | 2/2021 | Weiß | |

FOREIGN PATENT DOCUMENTS

| | | |
|---|---|---|
| JP | 2009-062840 | 3/2009 |
| JP | 2009-243374 | 10/2009 |
| JP | 2017-067033 | 4/2017 |
| WO | 2020/001805 | 1/2020 |

OTHER PUBLICATIONS

International Search Report dated Dec. 21, 2021 for PCT/JP2021/039683.

* cited by examiner

TURBOCHARGER WITH VARIABLE GEOMETRIC FLUID GUIDE MECHANISM

CROSS-REFERENCE TO RELATED APPLICATIONS

This application is a continuation application of PCT Application No. PCT/JP2021/039683, filed on Oct. 27, 2021, which claims the benefit of priority from Japanese Patent Application No. 2020-195046, filed on Nov. 25, 2020, the entire contents of which are incorporated herein by reference.

BACKGROUND ART

Japanese Unexamined Patent Publication No. 2009-243374, Japanese Unexamined Patent Publication No. 2017-67033 and Japanese Unexamined Patent Publication No. 2009-62840 disclose a turbocharger including a variable geometry system. For example, the turbocharger disclosed in the Japanese Unexamined Patent Publication No. 2009-243374 includes a case, a variable geometry system having an attachment portion, a support portion supporting the attachment portion of the variable geometry system, and a biasing portion that presses the support portion.

SUMMARY

An example turbocharger disclosed herein includes a turbine housing accommodating a turbine wheel, a bearing housing rotatably supporting a rotating shaft to which the turbine wheel is fixed, a variable geometry mechanism accommodated in the turbine housing, surrounding the turbine wheel, and configured to guide a fluid to the turbine wheel, and a spring member held by the variable geometry mechanism and the bearing housing in an axial direction along the rotating shaft. The variable geometry mechanism has an inner circumferential portion surrounding a through hole in which the turbine wheel or the rotating shaft is disposed, and an outer circumferential portion distanced further away from an axis of the rotating shaft than the inner circumferential portion. The outer circumferential portion includes a first end face contacting the spring member, and a second end face disposed on a back side of the first end face and contacting the turbine housing.

DETAILED DESCRIPTION

Figure 1:
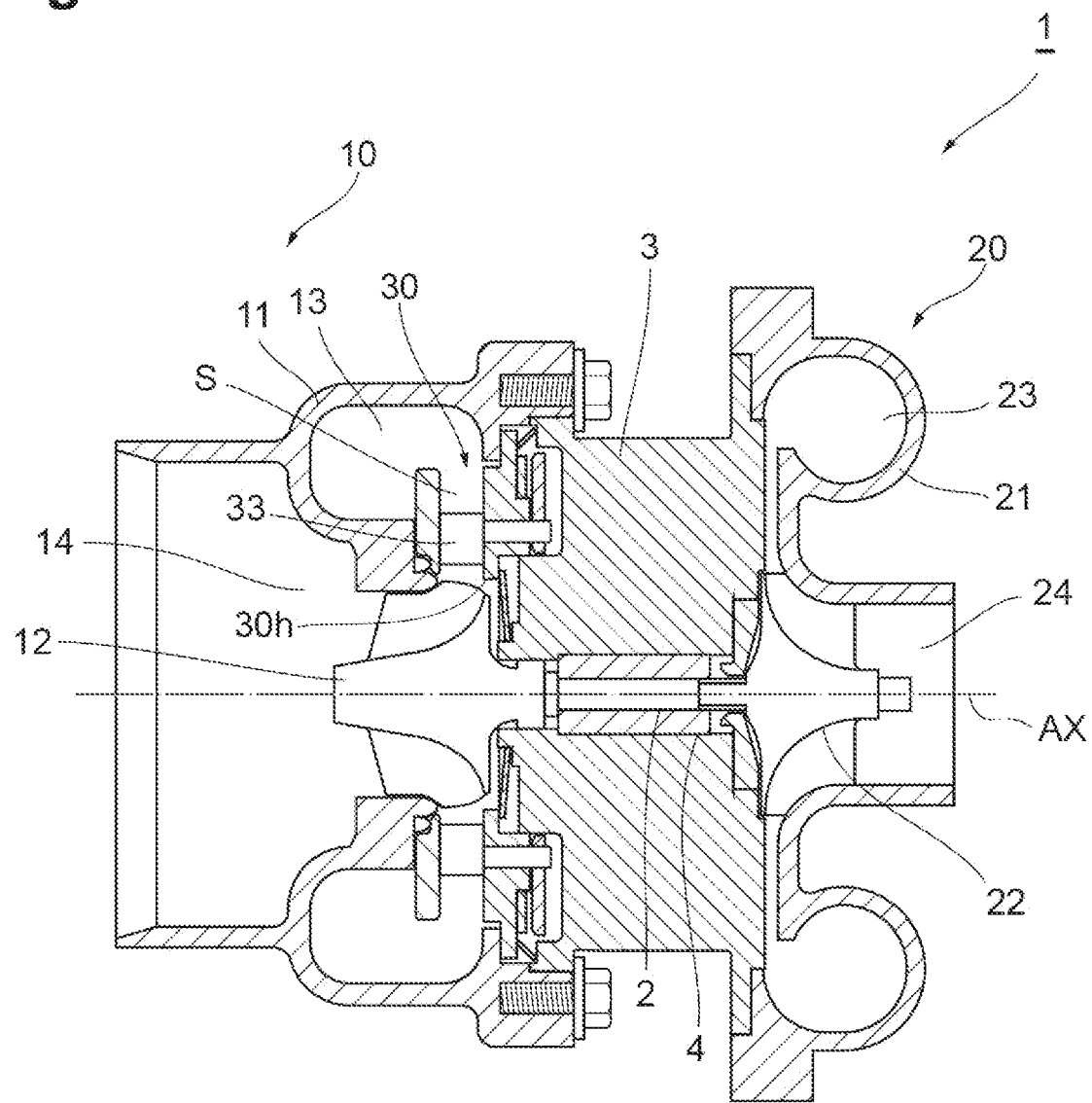
FIG. 1 is a cross-sectional view of an example turbocharger.

An example turbocharger may include a turbine housing accommodating a turbine wheel, a bearing housing rotatably supporting a rotating shaft to which the turbine wheel is fixed, a variable geometry mechanism accommodated in the turbine housing, surrounding the turbine wheel, and configured to guide a fluid to the turbine wheel, and a spring member held by the variable geometry mechanism and the bearing housing in an axial direction along the rotating shaft. The variable geometry mechanism has an inner circumferential portion surrounding a through hole in which the turbine wheel or the rotating shaft is disposed, and an outer circumferential portion distanced further away from an axis of the rotating shaft than the inner circumferential portion. The outer circumferential portion includes a first end face contacting the spring member, and a second end face disposed on a back side of the first end face and contacting the turbine housing.

In some examples, the spring member presses the first end face of the outer circumferential portion of the variable geometry mechanism. In the variable geometry mechanism, the second end face disposed on the back side of the first end face is pressed against the turbine housing. A pressing force of the spring member is applied to the first end face, so that a reaction force is applied to the second end face disposed on the back side of the first end face. The turbocharger is thus configured to suppress the generation of bending stress in the variable geometry mechanism. Consequently, the reliability of the turbocharger improves.

In some examples, the outer circumferential portion may further include an outer circumferential face portion connecting the first end face to the second end face. The turbine housing may have an inner circumferential face portion facing the outer circumferential face portion. An inner diameter of the inner circumferential face portion may be greater than an outer diameter of the outer circumferential face portion. When the variable geometry mechanism linearly expands due to high temperature, the gap between the outer diameter of the outer circumferential face portion and the inner diameter of the inner circumferential face portion allows deformation due to linear expansion along a radial direction intersecting the rotating shaft of the variable geometry mechanism. The reliability of the turbocharger thus improves.

In some examples, the turbocharger may include an auxiliary spring member disposed between the variable geometry mechanism and the bearing housing in the axial direction along the rotating shaft. The turbocharger is configured to distribute the force applied to the variable geometry mechanism. The reliability of the turbocharger thus improves.

In some examples, the bearing housing may have a first abutting face facing the axial direction along the rotating shaft. The turbine housing may have a second abutting face abutting against the first abutting face of the bearing housing. The position at which the second abutting face abuts against the first abutting face may be outward of the spring member in the radial direction intersecting the rotating shaft. The compression of the spring member is determined on the basis of the position of the first abutting face along the axial direction along the rotating shaft and the position of the second abutting face. The spring member is thus configured to apply a pressing force to the variable geometry mechanism. Consequently, the deformation of the variable geometry mechanism of the turbocharger can be suppressed.

In some examples, the spring member may be held by the first end face and the first abutting face. The position of the first abutting face is configured to be flush with the position of a surface that holds the spring member in the axial direction along the rotating shaft. The compression of the spring member of the turbocharger can thus be managed. Consequently, the deformation of the variable geometry mechanism of the turbocharger can be suppressed.

In some examples, the variable geometry mechanism may have a nozzle ring facing the bearing housing in the axial direction along the rotating shaft. The nozzle ring may have an inner circumferential portion and an outer circumferential portion.

The example turbocharger will be described in detail below with reference to the accompanying drawings. Hereinafter, with reference to the drawings, the same elements or similar elements having the same function are denoted by the same reference numerals, and redundant description will be omitted.

An example turbocharger 1 illustrated in FIG. 1 is a variable geometry turbocharger. The turbocharger 1 is applied, for example, to an internal combustion engine of a ship or a vehicle. The turbocharger 1 has a turbine 10 and a compressor 20. The turbine 10 has a turbine housing 11, a turbine wheel 12, and a variable geometry mechanism 30. The turbine housing 11 has a scroll channel 13. The scroll channel 13 is disposed around the turbine wheel 12. The scroll channel 13 extends in a circumferential direction about a rotational axis AX. In the description below, the circumferential direction about the rotational axis AX is referred to simply as the "circumferential direction." The compressor 20 has a compressor housing 21 and a compressor wheel 22. The compressor wheel 22 is accommodated in the compressor housing 21. The compressor housing 21 has a scroll channel 23. The scroll channel 23 is disposed around the compressor wheel 22. The scroll channel 23 extends in the circumferential direction.

The turbine wheel 12 is fixed to a first end of a rotating shaft 2. The turbine housing 11 accommodates the turbine wheel 12. The compressor wheel 22 is fixed to a second end of the rotating shaft 2. A bearing housing 3 is provided between the turbine housing 11 and the compressor housing 21. The rotating shaft 2 is rotatably supported by the bearing housing 3 via a bearing 4. The rotating shaft 2, the turbine wheel 12, and the compressor wheel 22 constitute a unitary rotor. The rotor rotates about the rotational axis AX of the rotating shaft 2.

The turbine housing 11 has an inlet and an outlet 14. The exhaust gas discharged from the internal combustion engine enters the turbine housing 11 after passing through the inlet. The exhaust gas enters the turbine wheel 12 after passing through the scroll channel 13. The exhaust gas entering the turbine wheel 12 rotates the turbine wheel 12. After rotating the turbine wheel 12, the exhaust gas flows outside the turbine housing 11 after passing through the outlet 14.

The compressor housing 21 has an inlet port 24 and an outlet port. The compressor wheel 22 rotates along with the rotation of the turbine wheel 12 via the rotating shaft 2. The rotating compressor wheel 22 sucks in outside air that has passed through the inlet port 24. The air sucked in is compressed while passing through the compressor wheel 22 and the scroll channel 23. The compressed air is discharged from the outlet port. The compressed air is supplied to the internal combustion engine.

The turbine 10 has a connection channel S. The connection channel S guides the exhaust gas from the scroll channel 13 to the turbine wheel 12. The turbine 10 has the variable geometry mechanism 30. The variable geometry mechanism 30 adjusts a cross-sectional area of the connection channel S. The variable geometry mechanism 30 adjusts a cross-sectional area of the connection channel S. The flow rate of the exhaust gas supplied to the turbine wheel 12 from the scroll channel 13 is controlled by adjusting the cross-sectional area of the connection channel S. The variable geometry mechanism 30 is thus configured to control the number of revolutions of the turbine wheel 12 to a predetermined or set value.

The variable geometry mechanism 30 is accommodated in the turbine housing 11. The variable geometry mechanism 30 surrounds the turbine wheel 12. The variable geometry mechanism 30 guides the exhaust gas (fluid) to the turbine wheel 12. The variable geometry mechanism 30 has a ring-like shape about the rotational axis AX. The variable geometry mechanism 30 has a through hole 30h. The variable geometry mechanism 30 surrounds the turbine wheel 12 disposed in the through hole 30h in the circumferential direction. The variable geometry mechanism 30 is disposed between the scroll channel 13 and the outlet 14.

Figure 2:
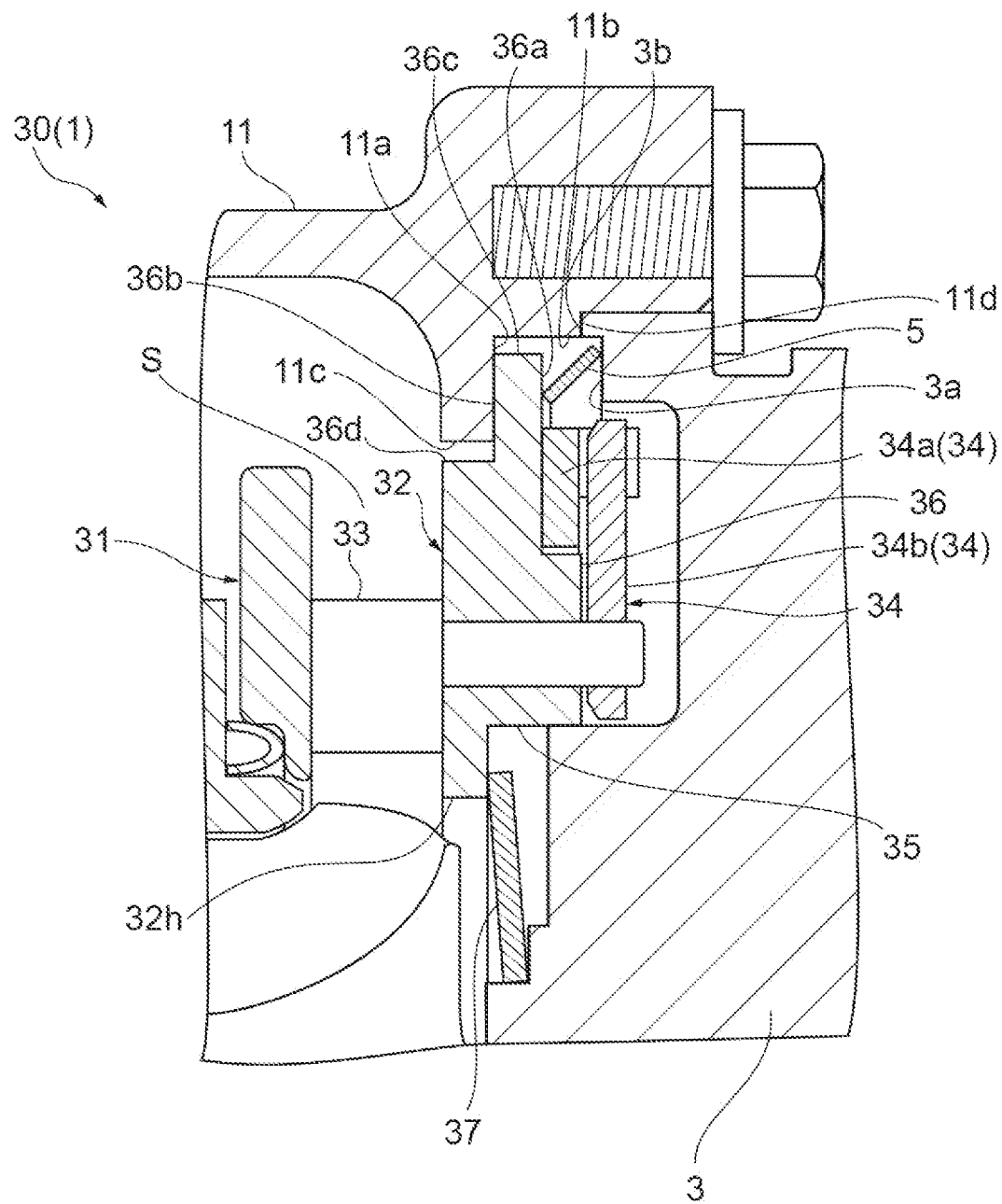
FIG. 2 is an enlarged cross-sectional view of the example turbocharger illustrated in FIG. 1 in the vicinity of a spring member.

As illustrated in FIG. 2, the variable geometry mechanism 30 has a clearance control (CC) plate 31, a nozzle ring 32, a plurality of nozzle vanes 33, and a drive mechanism 34. The CC plate 31 and the nozzle ring 32 also have a ring-like shape about the rotational axis AX similarly to the variable geometry mechanism 30. The CC plate 31 and the nozzle ring 32 constitute a part of the external shape of the variable geometry mechanism 30. The CC plate 31 is disposed parallel to the nozzle ring 32 in an axial direction along the rotational axis AX. In the description below, the axial direction along the rotational axis AX is referred to simply as the "axial direction." The distance between the CC plate 31 and the nozzle ring 32 is maintained by a CC pin. The CC plate 31 faces the nozzle ring 32. The nozzle ring 32 is located closer to the bearing housing 3 than the CC plate 31 in the axial direction. The connection channel S is formed between the CC plate 31 and the nozzle ring 32.

The nozzle ring 32 has an inner circumferential portion 35 and an outer circumferential portion 36. The inner circumferential portion 35 surrounds a through hole 32h in the nozzle ring 32. The turbine wheel 12 and the rotating shaft 2 are disposed in the through hole 32h. The inner circumferential portion 35 is an inner circumferential part of the nozzle ring 32. For example, shafts of the nozzle vanes 33 are disposed in the through hole. Additionally, the inner circumferential portion 35 may be defined as an inner side of a reference circle in which the through hole is disposed. The distance of the outer circumferential portion 36 from the rotational axis AX is greater than that of the inner circumferential portion 35. The outer circumferential portion 36 is an outer circumferential part of the nozzle ring 32. For example, the shafts of the nozzle vanes 33 are disposed in the through hole. Additionally, the outer circumferential portion 36 may be defined as an outer side of a reference circle in which the through hole is disposed. An outer diameter of the nozzle ring 32 is defined by an outer diameter of the outer circumferential portion 36.

The plurality of nozzle vanes 33 is disposed between the CC plate 31 and the nozzle ring 32. The nozzle vanes 33 are disposed equidistant from each other on a reference circle about the rotational axis AX. Adjacent nozzle vanes 33 constitute a nozzle. Each of the nozzle vanes 33 rotate about an axis parallel to the rotational axis AX. The rotations of the nozzle vanes 33 are synchronized. The rotations of the nozzle vanes 33 cause the distance between adjacent nozzle vanes 33 to change. The distance between the adjacent nozzle vanes 33 correspond to the cross-sectional area of the connection channel S. In some examples, the cross-sectional area of the connection channel S is adjusted by the change in the distance between the adjacent nozzle vanes 33.

The drive mechanism 34 is disposed between the nozzle ring 32 and the bearing housing 3. The drive mechanism 34 has a drive ring 34a and a nozzle link plate 34b. The drive ring 34a has a ring-like shape about the rotational axis AX. The nozzle link plate 34b is disposed more toward the bearing housing 3 than the drive ring 34a in the axial direction. The drive ring 34a surrounds a part of the nozzle ring 32 in the circumferential direction. The drive ring 34a is rotatable relative to the nozzle ring 32 about the rotational axis AX. The nozzle link plate 34b has a bar-like shape. A first end of the nozzle link plate 34b is connected to shaft end portions of the nozzle vanes 33. A second end of the nozzle link plate 34b is connected to the drive ring 34a. The second end of the nozzle link plate 34b moves along the circumferential direction with the rotation of the drive ring 34a. The plurality of nozzle vanes 33 connected to the first end of the nozzle link plate 34b rotates due to the movement of the second end of the nozzle link plate 34b.

The turbocharger 1 further includes a spring member 5. The spring member 5 is held by the variable geometry mechanism 30 and the bearing housing 3. The spring member 5 is compressively deformed along the axial direction. The outer circumferential portion 36 of the nozzle ring 32 includes a first end face 36a that contacts the spring member 5. The distance in the axial direction between the first end face 36a and an end face 3a of the bearing housing 3 is smaller than the equilibrium length of the spring member 5. The spring member 5 thus compressively deforms along the axial direction. The deformation of the spring member 5 is elastic deformation. The compressed spring member 5 thus exerts an elastic force.

In some examples, the spring member 5 is a disc spring. The disc spring has a disc shape having a through hole in the center, and is conically curved. The disc spring is used so as to compressively deform along a thickness direction. The end face 3a of the bearing housing 3 contacts a bottom face of the spring member 5. The end face 3a of the bearing housing 3 contacts an outer diameter part of the disc spring. The first end face 36a of the nozzle ring 32 contacts a top face of the spring member 5. The first end face 36a of the nozzle ring 32 contacts an inner diameter part of the disc spring. The first end face 36a of the nozzle ring 32 is a plane extending in a radial direction intersecting the rotational axis AX. In the description below, the radial direction intersecting the rotational axis AX is referred to simply as the "radial direction." The end face 3a of the bearing housing 3 is also a plane extending in the radial direction. The first end face 36a of the nozzle ring 32 is a ring-shaped surface extending in the circumferential direction. The end face 3a of the bearing housing 3 is also a ring-shaped surface extending in the circumferential direction.

The spring member 5 may be a wave washer.

The nozzle ring 32 includes a second end face 36b. The second end face 36b is disposed on a back side of the first end face 36a. The second end face 36b contacts an end face 11a of the turbine housing 11. The second end face 36b is parallel to the first end face 36a. The second end face 36b has a ring-like shape extending in the circumferential direction.

The turbine housing 11 contacts the second end face 36b of the nozzle ring 32. A region of the end face 11a of the turbine housing 11 that contacts the second end face 36b of the nozzle ring 32 has a ring-like shape extending in the circumferential direction. When viewed in the axial direction, the position in the radial direction at which the first end face 36a of the nozzle ring 32 contacts the spring member 5 overlaps with the position in the radial direction of a surface at which the second end face 36b of the nozzle ring 32 contacts the end face 11a of the turbine housing 11. In some examples, the elastic force exerted by the spring member 5 acts on the position at which the first end face 36a of the nozzle ring 32 contacts the spring member 5. When viewed in the axial direction, the position on which the elastic force acts overlaps with the surface at which the second end face 36b of the nozzle ring 32 contacts the end face 11a of the turbine housing 11.

The outer circumferential portion 36 of the nozzle ring 32 includes a first outer circumferential face portion 36c and a second outer circumferential face portion 36d. The first outer circumferential face portion 36c, which is a circumferential face, connects the first end face 36a to the second end face 36b. The second outer circumferential face portion 36d, which is a circumferential face, extends toward the turbine housing 11 from the second end face 36b. The first outer circumferential face portion 36c and the second outer circumferential face portion 36d are outer faces of cylinders about the rotational axis AX. The first outer circumferential face portion 36c defines an outer diameter of the variable geometry mechanism 30 in the radial direction. An outer diameter of the second outer circumferential face portion 36d is smaller than an outer diameter of the first outer circumferential face portion 36c. For example, the outer diameter of the second outer circumferential face portion 36d may be equal to an outer diameter of the CC plate 31.

The turbine housing 11 has a first inner circumferential face portion 11b and a second inner circumferential face portion 11c. The first inner circumferential face portion 11b is an inner face of a cylinder about the rotational axis AX. The second inner circumferential face portion 11c is also an inner face of a cylinder about the rotational axis AX. The first inner circumferential face portion 11b, which is an inner circumferential face, extends toward the bearing housing 3 from the end face 11a of the turbine housing 11. The second inner circumferential face portion 11c, which is an inner circumferential face, extends toward an opposite side of the first inner circumferential face portion 11b from the end face 11a of the turbine housing 11. The end face 11a of the turbine housing connects the first inner circumferential face portion 11b to the second inner circumferential face portion 11c. The first inner circumferential face portion 11b faces the rotational axis AX, and faces the first outer circumferential face portion 36c of the nozzle ring 32 along the radial direction. The second inner circumferential face portion 11c faces the rotational axis AX, and faces the second outer circumferential face portion 36d of the nozzle ring 32 along the radial direction.

An inner diameter of the first inner circumferential face portion 11b of the turbine housing 11 is greater than the outer diameter of the first outer circumferential face portion 36c of the nozzle ring 32. There is a gap between the first inner circumferential face portion 11b and the first outer circumferential face portion 36c in the radial direction. An inner diameter of the second inner circumferential face portion 11c of the turbine housing 11 is greater than the outer diameter of the second outer circumferential face portion 36d of the nozzle ring 32. There is also a gap between the second inner circumferential face portion 11c and the second outer circumferential face portion 36d in the radial direction.

The turbocharger 1 has a seal member 37. The seal member 37 is disposed in the inner circumferential portion 35. The seal member 37 has the shape of a ring-like plate member about the rotational axis AX. The seal member 37 may, for example, have a conically curved shape. The seal member 37 is disposed between the nozzle ring 32 and the bearing housing 3. The seal member 37 is held by the nozzle ring 32 and the bearing housing 3. The seal member 37 avoids exhaust gas on the turbine housing 11 side from flowing into the bearing housing 3 side.

The bearing housing 3 has a first abutting face 3b facing the axial direction such that the first abutting face 3b is perpendicular to the axial direction. The first abutting face 3b has a ring-like shape extending in the circumferential direction. The position of the first abutting face 3b is outward of the end face 3a of the turbine housing 11 in the radial direction. The first abutting face 3b projects toward the turbine housing 11 from the end face 3a of the bearing housing 3 in the axial direction. The turbine housing 11 has a second abutting face 11d. The second abutting face 11d abuts against the first abutting face 3b. The second abutting face 11d is parallel to the first abutting face 3b. The second abutting face 11d has a ring-like shape extending in the circumferential direction. The second abutting face 11d is an end face extending perpendicularly outward in the radial direction from the first inner circumferential face portion 11b. The position at which the first abutting face 3b abuts against the second abutting face 11d is outward of the spring member 5 in the radial direction.

In some examples, the turbocharger 1, the spring member 5 presses the variable geometry mechanism 30 toward the turbine housing 11. The variable geometry mechanism 30 has the nozzle ring 32. The spring member 5 presses the first end face 36a included in the outer circumferential portion 36 of the nozzle ring 32. The force generated in the spring member 5 acts on the first end face 36a. The second end face 36b of the nozzle ring 32 is pressed against the turbine housing 11. The second end face 36b is disposed on the back side of the first end face 36a. The reaction force of this force acts on the second end face 36b disposed on the back side of the first end face 36a. The force of the spring member 5 and the reaction force may be coupled or interrelated. For example, the forces may have the same magnitude, but have opposite directions. Thus, the greater the distance between the force of the spring member 5 and the reaction force, the greater the force for bending a member. However, in the example turbocharger 1, the distance from the position against which the spring member 5 is pressed to the position on which the reaction force of the pressing force acts is small. The variable geometry mechanism 30 can thus reduce the magnitude of the bending stress that is generated. The amount of deformation of the variable geometry mechanism 30 along the axial direction is reduced due to the reduction in the magnitude of the bending stress generated in the variable geometry mechanism 30. Deformation of the variable geometry mechanism 30 at high temperatures due to the so-called creep phenomenon is also suppressed. The temperature of the components constituting the variable geometry mechanism 30 rises due to the high temperature gas supplied to the variable geometry mechanism 30. The Young's modulus of the components constituting the variable geometry mechanism 30 decreases with the rise in the temperature. The components constituting the variable geometry mechanism 30 thus tend to deform. However, the deformation of the components constituting the variable geometry mechanism 30 is suppressed by the reduction in the bending stress generated in the variable geometry mechanism 30.

In some examples, the deformation of the inner circumferential portion 35 curving toward the turbine housing 11 is suppressed. The distance between the CC plate 31 and the nozzle ring 32 can thus be maintained at a predetermined state. As a result, a state in which the nozzle vanes 33 can normally rotate can be maintained. A contact between the nozzle vanes 33 and the CC plate 31 is suppressed. Contact between the nozzle vanes 33 and the nozzle ring 32 is also suppressed. Normal rotary motion of the nozzle vanes 33 is thus maintained. The rotary motion of the nozzle vanes 33 influences the motion of the variable geometry mechanism 30. The variable geometry mechanism 30 reliably moves by maintaining the rotary motion of the nozzle vanes 33. Consequently, the reliability of the turbocharger 1 improves.

In some examples, the distance between the end face 3a of the bearing housing 3 and the first end face 36a of the nozzle ring 32 is determined on the basis of the position of the first abutting face 3b in the axial direction. The compression of the spring member 5 is determined on the basis of the positions of the first abutting face 3b and the second abutting face 11d in the axial direction. As a result, the spring member 5 presses the variable geometry mechanism 30. The deformation of the variable geometry mechanism 30 of the turbocharger 1 is thus suppressed.

When the temperature of the example turbocharger 1 rises, the variable geometry mechanism 30 can linearly expand in the radial direction, with the gap between the outer diameter of the first outer circumferential face portion 36c and the inner diameter of the first inner circumferential face portion 11b being the acceptable range. This deformation by expansion does not affect the motion of the variable geometry mechanism 30. Deformation that interferes with the motion of the variable geometry mechanism 30 caused by the variable geometry mechanism 30 not being able to linearly expand in the radial direction can be suppressed. The reliability of the turbocharger 1 can thus be further improved.

In some examples, the variable geometry mechanism 30 is pressed against the turbine housing 11 by the spring member 5. The pressing force of the spring member 5 in the axial direction is smaller than the axial force generated by the fastening of bolts and the like. Thus, linear expansion of the variable geometry mechanism 30 in the radial direction is facilitated.

Figure 3:
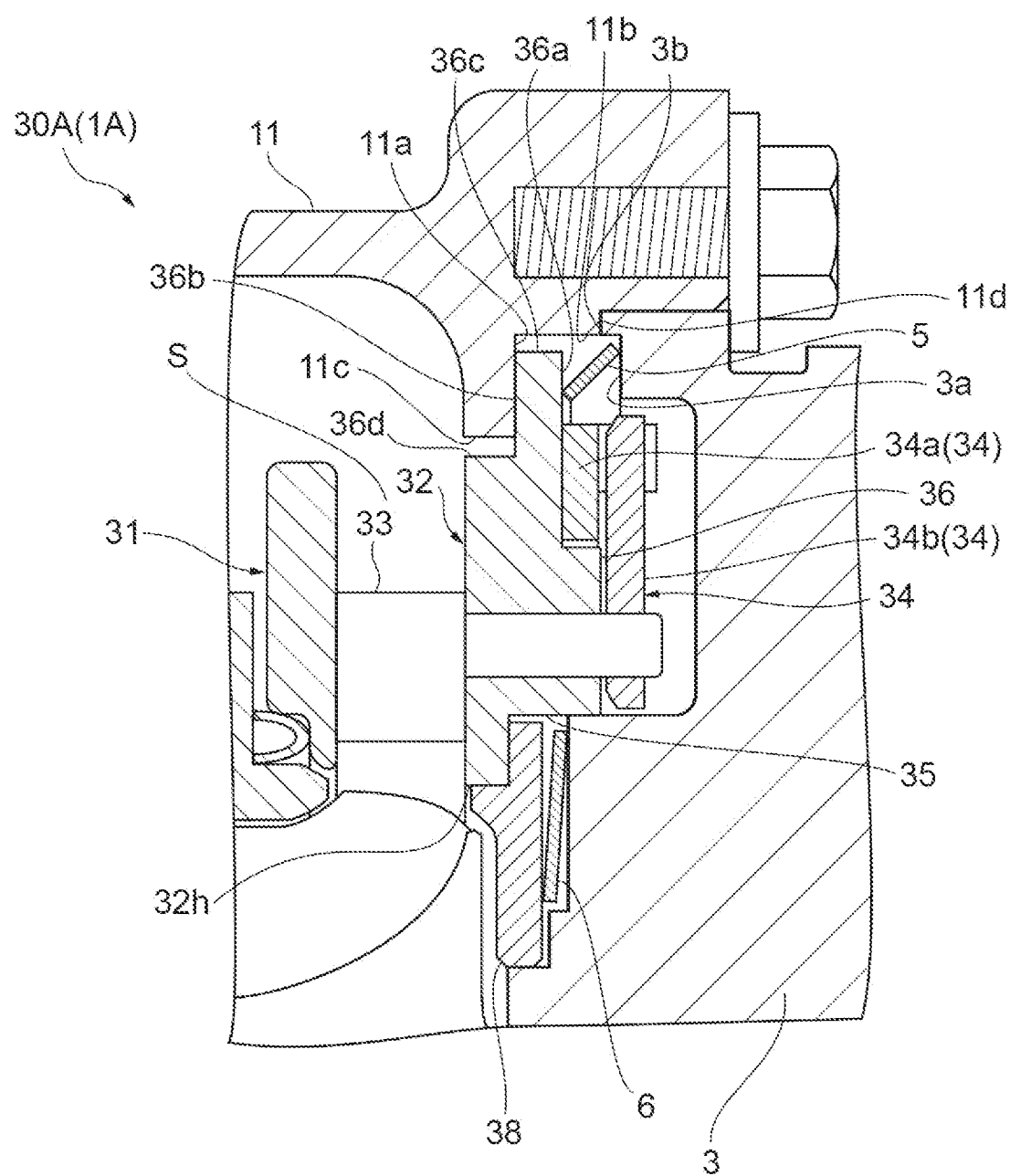
FIG. 3 is an enlarged cross-sectional view illustrating part of an example turbocharger.

A turbocharger 1A illustrated in FIG. 3 is a variable geometry turbocharger. The turbocharger 1A is different from the turbocharger 1 in that the turbocharger 1A has an auxiliary spring member 6 and a heat shield 38.

The turbocharger 1A includes the auxiliary spring member 6. The auxiliary spring member 6 is disposed between a variable geometry mechanism 30A and the bearing housing 3 in the axial direction via the heat shield 38.

The turbocharger 1A includes the heat shield 38 instead of the seal member 37. The heat shield 38 is disposed on an inner side of the inner circumferential portion 35. The heat shield 38 has a ring-like shape about the rotational axis AX. The heat shield 38 inhibits heat transfer from the turbine housing 11 to the bearing housing 3. As a result, the rise in the temperature of the components disposed on the bearing housing 3 side is suppressed. The auxiliary spring member 6 compressively deforms in the axial direction by being disposed between the heat shield 38 and the bearing housing 3. The auxiliary spring member 6 exerts an elastic force opposing the compressive deformation. The auxiliary spring member 6 presses the heat shield 38 against the nozzle ring 32.

In some examples, the force applied to the variable geometry mechanism 30A can be distributed among the spring member 5 and the auxiliary spring member 6. The deformation of the variable geometry mechanism 30A of the turbocharger 1A can be suppressed by distributing the force applied to the variable geometry mechanism 30A. The heat shield 38 of the turbocharger 1A is configured to press against the nozzle ring 32.

Figure 4:
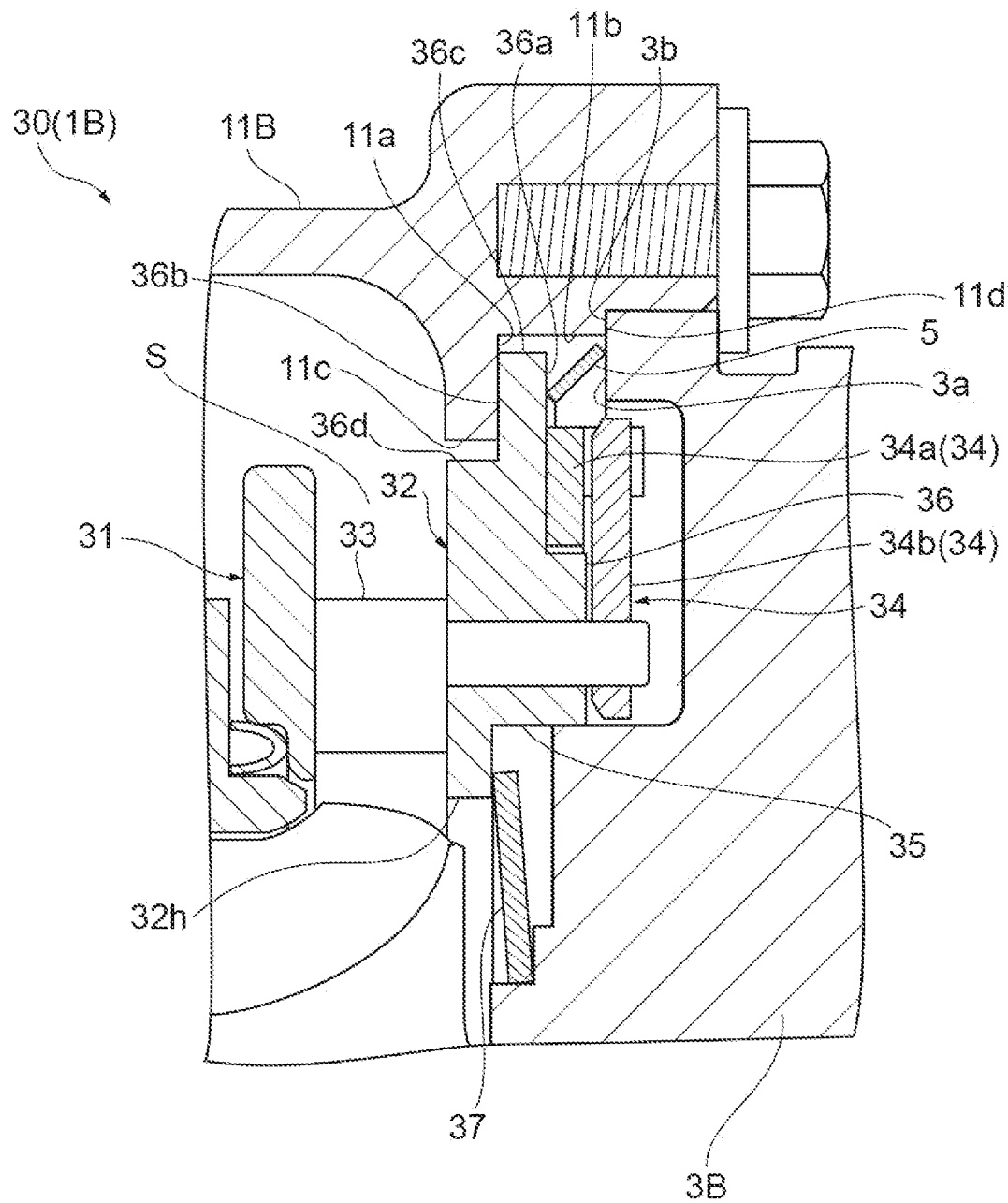
FIG. 4 is an enlarged cross-sectional view illustrating part of another example turbocharger.

A turbocharger 1B illustrated in FIG. 4 is a variable geometry turbocharger. The turbocharger 1B is different from the turbocharger 1 in the shape and the like of a bearing housing 3B and a turbine housing 11B.

The first abutting face 3b of the bearing housing 3B does not project from the end face 3a of the bearing housing 3B. The end face 3a of the bearing housing 3B is flush with the first abutting face 3b. The position of the second abutting face 11d of the turbine housing 11B is adjusted along the axial direction such that the compression of the spring member 5 is smaller than that of the turbocharger 1.

In some examples, the position of the first abutting face 3b and the position of the end face 3a that holds the spring member 5 are defined to be on the sample plane. The compression of the spring member 5 of the turbocharger 1B can thus be managed. The reliability of the turbocharger 1B can be improved similarly to the turbocharger 1.

Figure 5:
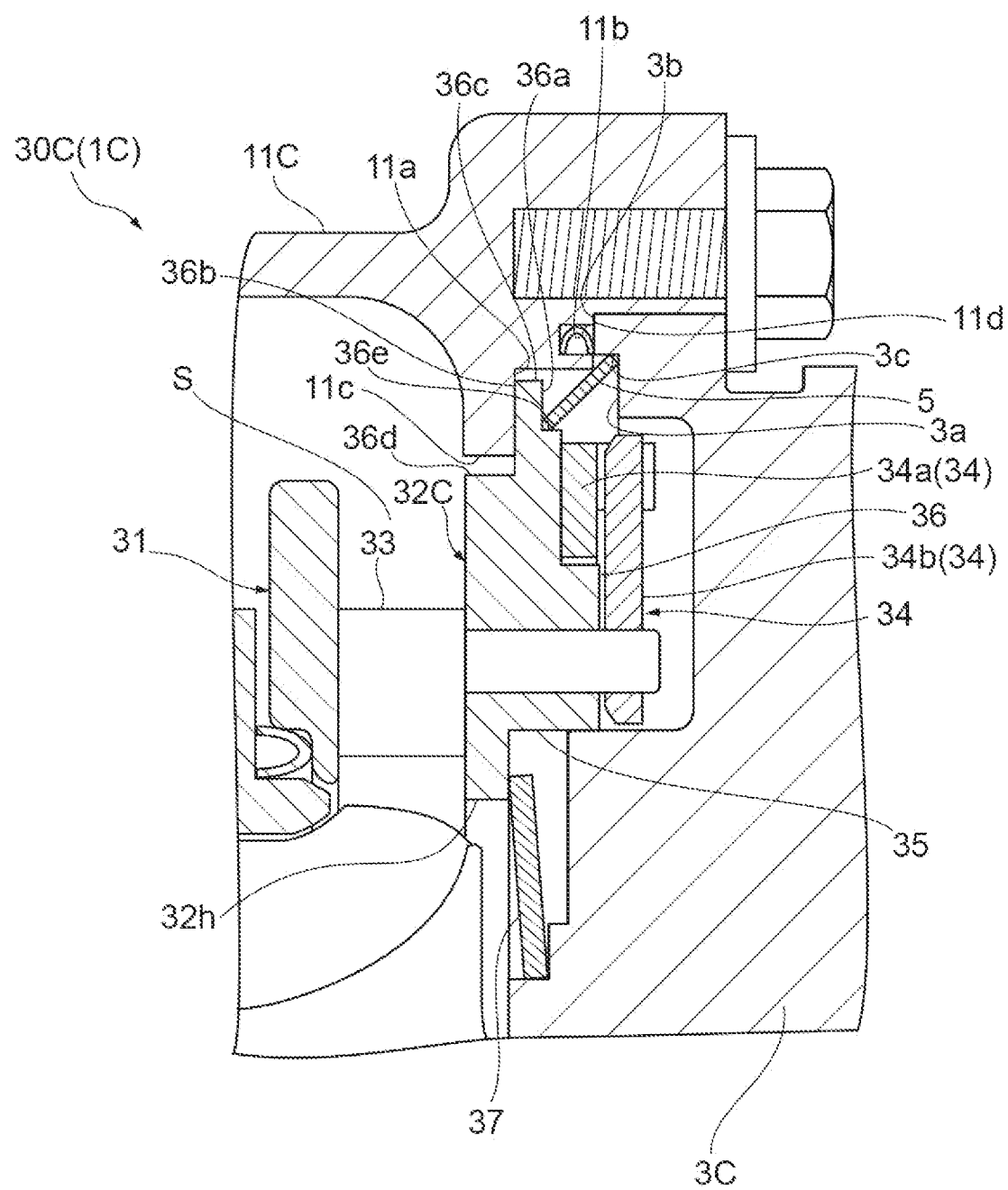
FIG. 5 is an enlarged cross-sectional view illustrating part of yet another example turbocharger.

Another example turbocharger 1C is illustrated in FIG. 5. The turbocharger 1C is different from the turbocharger 1 in the shape and the like of a bearing housing 3C and a variable geometry mechanism 30C.

The bearing housing 3C has a third inner circumferential face 3c facing the radial direction. The third inner circumferential face 3c is an inner face of a cylinder about the rotational axis AX. In the bearing housing 3C, the third inner circumferential face 3c extends perpendicularly toward a turbine housing 11C from the end face 3a of the bearing housing 3C that holds the spring member 5. The third inner circumferential face 3c faces inward in the radial direction and contacts the spring member 5.

A nozzle ring 32C has a third outer circumferential face 36e that faces outward in the radial direction. The third outer circumferential face 36e is an outer face of a cylinder about the rotational axis AX. In the nozzle ring 32C, the third outer circumferential face 36e extends perpendicularly toward the bearing housing 3C from the first end face 36a that holds the spring member 5. An outer diameter of the third outer circumferential face 36e is smaller than the outer diameter of the first outer circumferential face portion 36c. The third outer circumferential face 36e faces outward in the radial direction and contacts the spring member 5.

The spring member 5 of the turbocharger 1C is disposed between the first end face 36a of the nozzle ring 32C and the end face 3a of the bearing housing 3C in the axial direction. The spring member 5 is held by the nozzle ring 32C and the bearing housing 3C. Additionally, the spring member 5 is disposed between the third outer circumferential face 36e of the nozzle ring 32C and the third inner circumferential face 3c of the bearing housing 3C in the radial direction. The spring member 5 is held by the nozzle ring 32C and the bearing housing 3C. Accordingly, reliability can be improved similarly to the turbocharger 1.

It is to be understood that not all aspects, advantages and features described herein may necessarily be achieved by, or included in, any one particular example. Indeed, having described and illustrated various examples herein, it may be apparent that other examples may be modified in arrangement and detail. For example, the above configuration described with respect to the example turbocharger 1C may also be applied to other turbocharges disclosed herein, including the turbocharger 1A and the turbocharger 1B.

The invention claimed is:

1. A turbocharger comprising:
   a turbine housing accommodating a turbine wheel, wherein the turbine housing comprises a scroll channel and a connection channel located between the scroll channel and the turbine wheel;
   a bearing housing rotatably supporting a rotating shaft to which the turbine wheel is fixed;
   a variable geometry mechanism accommodated in the turbine housing, and configured to guide a fluid to the turbine wheel; and
   a spring member located between the variable geometry mechanism and the bearing housing,
   wherein the variable geometry mechanism includes:
      a nozzle vane located in the connection channel;
      a nozzle ring rotatably supports the nozzle vane;
      a drive mechanism located between the nozzle ring and the bearing housing and configured to rotate the nozzle vane;
      an inner circumferential portion surrounding a through hole in which the turbine wheel or the rotating shaft is disposed; and
      an outer circumferential portion located between the spring member and the turbine housing,
   wherein a distance between the outer circumferential portion and an axis of the rotating shaft is greater than a distance between the inner circumferential portion and the axis of the rotating shaft,
   wherein the outer circumferential portion includes a first end face contacting the spring member, and a second end face contacting the turbine housing, and
   wherein the drive mechanism is located between the spring member and the axis of the rotating shaft.

2. The turbocharger according to claim 1,
   wherein the outer circumferential portion further includes an outer circumferential face portion connecting the first end face to the second end face,
   wherein the turbine housing has an inner circumferential face portion facing the outer circumferential face portion and the spring member, and
   wherein an inner diameter of the inner circumferential face portion is greater than an outer diameter of the outer circumferential face portion.

3. The turbocharger according to claim 1,
   further comprising an auxiliary spring member disposed between the variable geometry mechanism and the bearing housing in an axial direction along the rotating shaft,
   wherein the distance from the spring member to the rotating shaft is greater than a distance from the spring member to the auxiliary spring member.

4. The turbocharger according to claim 1, wherein the bearing housing has a first abutting face facing the axial direction along the rotating shaft,
   wherein the turbine housing has a second abutting face contacting the first abutting face of the bearing housing,
   wherein a position at which the second abutting face contacts the first abutting face is outward of the spring member in a radial direction intersecting the rotating shaft,
   wherein the spring member has a disk shape including a through hole in a center of the spring member, and
   wherein the spring member is held between the first end face and the first abutting face.

5. The turbocharger according to claim 1,
   wherein the drive mechanism comprises a drive ring configured to rotate the nozzle vane via a nozzle link plate, and
   wherein the drive ring is located between the spring member and the rotating shaft.

6. The turbocharger according to claim 1,
   wherein the drive mechanism comprises:
      a nozzle link plate connected to the nozzle vane; and a drive ring connected to the nozzle link plate, and configured to rotate the nozzle vane via the nozzle link plate, and
wherein the nozzle link plate includes:
a first end portion connected to the nozzle vane; and
a second end portion connected to the drive ring, and
wherein a distance between the spring member and the axis of the rotating shaft is greater than a distance between the second end portion of the nozzle link plate and the axis of the rotating shaft.

7. A turbocharger comprising:
a turbine housing accommodating a turbine wheel;
a bearing housing rotatably supporting a rotating shaft to which the turbine wheel is fixed;
a variable geometry mechanism accommodated in the turbine housing, and configured to guide a fluid to the turbine wheel; and
a spring member disposed between the variable geometry mechanism and the bearing housing,
wherein the variable geometry mechanism has a nozzle ring facing the bearing housing,
wherein the nozzle ring includes:
a first end face contacting the spring member;
a second end face contacting the turbine housing;
a first outer circumferential face; and
a second outer circumferential face that extends from the second end face and away from the spring member, and
wherein an outer diameter of the second outer circumferential face is smaller than an outer diameter of the first outer circumferential face.

8. The turbocharger according to claim 7, wherein a position at which the first end face contacts the spring member overlaps with a region in which the second end face contacts the turbine housing.

9. The turbocharger according to claim 7, wherein a position at which the spring member contacts the first end face is closer to an axis of the rotating shaft than a position at which the spring member contacts the bearing housing.

10. The turbocharger according to claim 7, wherein the first outer circumferential face connects the first end face to the second end face, and defines an outer diameter of the variable geometry mechanism.

11. The turbocharger according to claim 7, wherein an inner circumferential edge of the spring member contacts the first end face.

12. The turbocharger according to claim 7, wherein the variable geometry mechanism further has a clearance control plate,
wherein the nozzle ring is disposed closer to the bearing housing than the clearance control plate, and
wherein an outer diameter of the clearance control plate is smaller than the outer diameter of the first outer circumferential face.

13. A turbocharger comprising:
a turbine housing accommodating a turbine wheel;
a bearing housing rotatably supporting a rotating shaft to which the turbine wheel is fixed;
a variable geometry mechanism accommodated in the turbine housing, and configured to guide a fluid to the turbine wheel; and
a spring member disposed between the variable geometry mechanism and the bearing housing,
wherein the variable geometry mechanism has a nozzle ring facing the bearing housing,
wherein the nozzle ring includes a first end face contacting the spring member and a second end face contacting the turbine housing, and
wherein the spring member is a disc spring having a ring shape, and an inner diameter of the spring member is smaller than an outer diameter of the first end face and greater than an outer diameter of the second end face.

14. The turbocharger according to claim 13, wherein the nozzle ring includes:
a first outer circumferential face; and
a second outer circumferential face having an outer diameter smaller than an outer diameter of the first outer circumferential face.

15. A turbocharger comprising:
a turbine housing accommodating a turbine wheel;
a bearing housing rotatably supporting a rotating shaft to which the turbine wheel is fixed;
a variable geometry mechanism accommodated in the turbine housing, and configured to guide a fluid to the turbine wheel; and
a spring member disposed between the variable geometry mechanism and the bearing housing,
wherein the variable geometry mechanism has a nozzle ring facing the bearing housing,
wherein the nozzle ring includes a first end face contacting the spring member and a second end face contacting the turbine housing,
wherein the nozzle ring includes a first outer circumferential face and a second outer circumferential face having an outer diameter smaller than an outer diameter of the first outer circumferential face, and
wherein the turbine housing has a first inner circumferential face facing the first outer circumferential face, and a second inner circumferential face facing the second outer circumferential face.

16. The turbocharger according to claim 15, wherein an inner diameter of the first inner circumferential face is greater than the outer diameter of the first outer circumferential face, and an inner diameter of the second inner circumferential face is greater than the outer diameter of the second outer circumferential face.

17. A turbocharger comprising:
a turbine housing accommodating a turbine wheel;
a bearing housing rotatably supporting a rotating shaft to which the turbine wheel is fixed;
a variable geometry mechanism accommodated in the turbine housing, and configured to guide a fluid to the turbine wheel; and
a spring member disposed between the variable geometry mechanism and the bearing housing,
wherein the variable geometry mechanism has a nozzle ring facing the bearing housing,
wherein the nozzle ring includes:
a first end face contacting the spring member and a second end face contacting the turbine housing;
a first outer circumferential face;
a second outer circumferential face that extends from the second end face and away from the spring member; and
a third outer circumferential face contacting the spring member,
wherein an outer diameter of the second outer circumferential face is smaller than an outer diameter of the first outer circumferential face, and
wherein an outer diameter of the third outer circumferential face is smaller than the outer diameter of the first outer circumferential face.

18. A turbocharger comprising:
a turbine housing accommodating a turbine wheel;
a bearing housing rotatably supporting a rotating shaft to which the turbine wheel is fixed;
a variable geometry mechanism accommodated in the turbine housing, and configured to guide a fluid to the turbine wheel;
a spring member disposed between the variable geometry mechanism and the bearing housing;
a heat shield having a ring-like shape about the rotating shaft; and
an auxiliary spring member disposed between the variable geometry mechanism and the bearing housing.

19. The turbocharger according to claim 18, wherein the auxiliary spring member is compressed between the heat shield and the bearing housing in an axial direction of the rotating shaft.

\* \* \* \* \*